(12) United States Patent
Ford et al.

(10) Patent No.: US 7,124,488 B2
(45) Date of Patent: Oct. 24, 2006

(54) RETROFIT BREAKER ADAPTER SYSTEM AND METHOD

(75) Inventors: Timothy T. Ford, Florence, SC (US); Murray K. Jones, Johnsonville, SC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 11/036,680

(22) Filed: Jan. 14, 2005

(65) Prior Publication Data

US 2005/0167256 A1    Aug. 4, 2005

Related U.S. Application Data

(60) Provisional application No. 60/536,923, filed on Jan. 16, 2004.

(51) Int. Cl.
*B23P 19/04* (2006.01)
*H01H 9/24* (2006.01)
*H02B 1/04* (2006.01)
*H05K 7/00* (2006.01)

(52) U.S. Cl. ............. 29/401.1; 29/434; 29/402.08; 200/50.24; 361/728; 361/837; 361/673

(58) Field of Classification Search .............. 29/401.1, 29/434, 402.08; 200/400, 50.27, 50.24, 50.21; 361/728–731, 781, 807–810, 832, 837, 652–656, 361/673
See application file for complete search history.

(56) References Cited

U.S. PATENT DOCUMENTS

| | | | | |
|---|---|---|---|---|
| 4,728,757 A | * | 3/1988 | Buxton et al. | 200/50.21 |
| 5,142,110 A | * | 8/1992 | Kuehne et al. | 218/42 |
| 6,838,626 B1 | * | 1/2005 | Deylitz et al. | 200/50.21 |
| 6,951,990 B1 | * | 10/2005 | Miller | 200/50.21 |

* cited by examiner

*Primary Examiner*—David P. Bryant
*Assistant Examiner*—Christopher M. Koehler
(74) *Attorney, Agent, or Firm*—Paul R. Katterle

(57) ABSTRACT

The present invention is directed to a system for modifying a circuit breaker for removable installation in a cell of switchgear system, wherein the unmodified circuit breaker is not adapted for mounting in the cell. The system includes an adapter frame to which the circuit breaker is mounted and gear assemblies mounted to opposing sides of the circuit breaker. The gear assemblies adapt a racking device of the circuit breaker so as to be operable to rack the circuit breaker within the cell of the switchgear system.

8 Claims, 9 Drawing Sheets

RETROFIT BREAKER ADAPTER SYSTEM AND METHOD

CROSS-REFERENCE TO RELATED APPLICATIONS

This application claims the benefit of U.S. provisional patent application No. 60/536,923 filed on Jan. 16, 2004, which is hereby incorporated by reference in its entirety.

BACKGROUND OF THE INVENTION

The present invention relates to electrical switchgear, and more particularly, to an adapter system and method for retrofitting existing switchgear with new, removable power circuit breakers.

Many types of low- and medium-voltage switchgear systems use power circuit breakers that can be withdrawn for maintenance. Power circuit breakers from various manufacturers are not interchangeable, and as the manufacturers have eliminated older products and introduced new technologies, the new products have not maintained compatibility with existing switchgear. The result is that many aging switchgear installations have power circuit breakers that are costly or impractical to maintain. Complete replacement of switchgear is very expensive and requires significant downtime. In the past, upgrading of obsolete circuit breakers was accomplished by significantly modifying a new circuit breaker to fit the switchgear cell, or by modifying the switchgear cell to accept a new breaker.

The current art for circuit breaker retrofits is time-consuming and costly, and may also impact customer system downtime for initial installation as well as on-going reliability issues. One conventional approach is based on adapting a new replacement breaker cradle to the existing switchgear cell by using a "cradle-within-a-cradle" approach. This requires a means of inserting, connecting and supporting the new cradle to existing primary and secondary parts inside the switchgear. This process requires additional space that complicates dielectric and heat run considerations, places an additional layer of interface that impacts reliability by creating additional points of failure for the racking system, increases susceptibility to high momentary currents, and increases material costs. A second approach has been to simply remove the interrupters and operating mechanism from the existing breaker, refurbish and reuse many of the parts, and adapt a new fixed-mount breaker to the existing withdrawal assembly. Another version of this approach is to adapt a new replacement breaker to the existing cell by recreating the existing racking and connection schemes around a fixed-mount version of the new breaker. These processes complicate the interlocking and auxiliary contact functions, and require extensive custom design work and materials.

It would therefore be desirable, if a solution were available to replace an allow a new circuit breaker to be used in an existing switchgear breaker compartment, without the need to significantly modify either component. Such a solution would help to minimize de-energization and load interruption. The present invention addresses this need.

SUMMARY OF THE INVENTION

In accordance with the present invention, a method of producing a retrofitted circuit breaker is provided. The retrofitted circuit breaker is for use in a switchgear assembly having a cell with a racking structure disposed therein. In accordance with the method, a circuit breaker is provided that is not adapted for mounting in the cell. The circuit breaker includes a mechanical linkage connected to a shaft. The mechanical linkage is actuatable to rotate the shaft. An adapter frame, a racking arm and a gear assembly with first and second gears are also provided. The gear assembly is mounted to the circuit breaker so as to be operatively engaged by the shaft such that the rotation of the shaft causes rotation of the second gear, wherein the axis of rotation of the second gear is not coaxial with the axis of rotation of the shaft. The racking arm is connected to the second gear of the gear assembly such that rotation, of the second gear causes the racking arm to rotate. The circuit breaker is mounted to the adapter frame. The circuit breaker with the adapter frame and the gear assembly is adapted for mounting within the cell such that when the circuit breaker is in a first, disconnected position in the cell and the mechanical linkage is actuated, the racking arm engages the racking structure of the cell and pivots, thereby moving the circuit breaker farther into the cell to a second, connected position.

Also provided in accordance with the present invention is a circuit breaker assembly for removable mounting in a cell of a switchgear. The circuit breaker assembly includes a housing with first and second side walls and a rotatable shaft disposed in the housing and having an outer end extending through an opening in the first side wall of the housing. A mechanical linkage is connected to the shaft and is actuatable to rotate the shaft. A gear assembly is secured to the first side wall and includes first and second gears. The gear assembly is operatively engaged by the outer end of the shaft such that the rotation of the shaft causes rotation of the second gear, wherein the axis of rotation of the second gear is not coaxial with the axis of rotation of the shaft. A racking arm is connected to the second gear of the gear assembly such that rotation of the second gear causes the racking arm to rotate, whereby when the circuit breaker is in a first, disconnected position in the cell and the mechanical linkage is actuated, the racking arm engages a portion of the cell and pivots, thereby moving the circuit breaker farther into the cell to a second, connected position.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
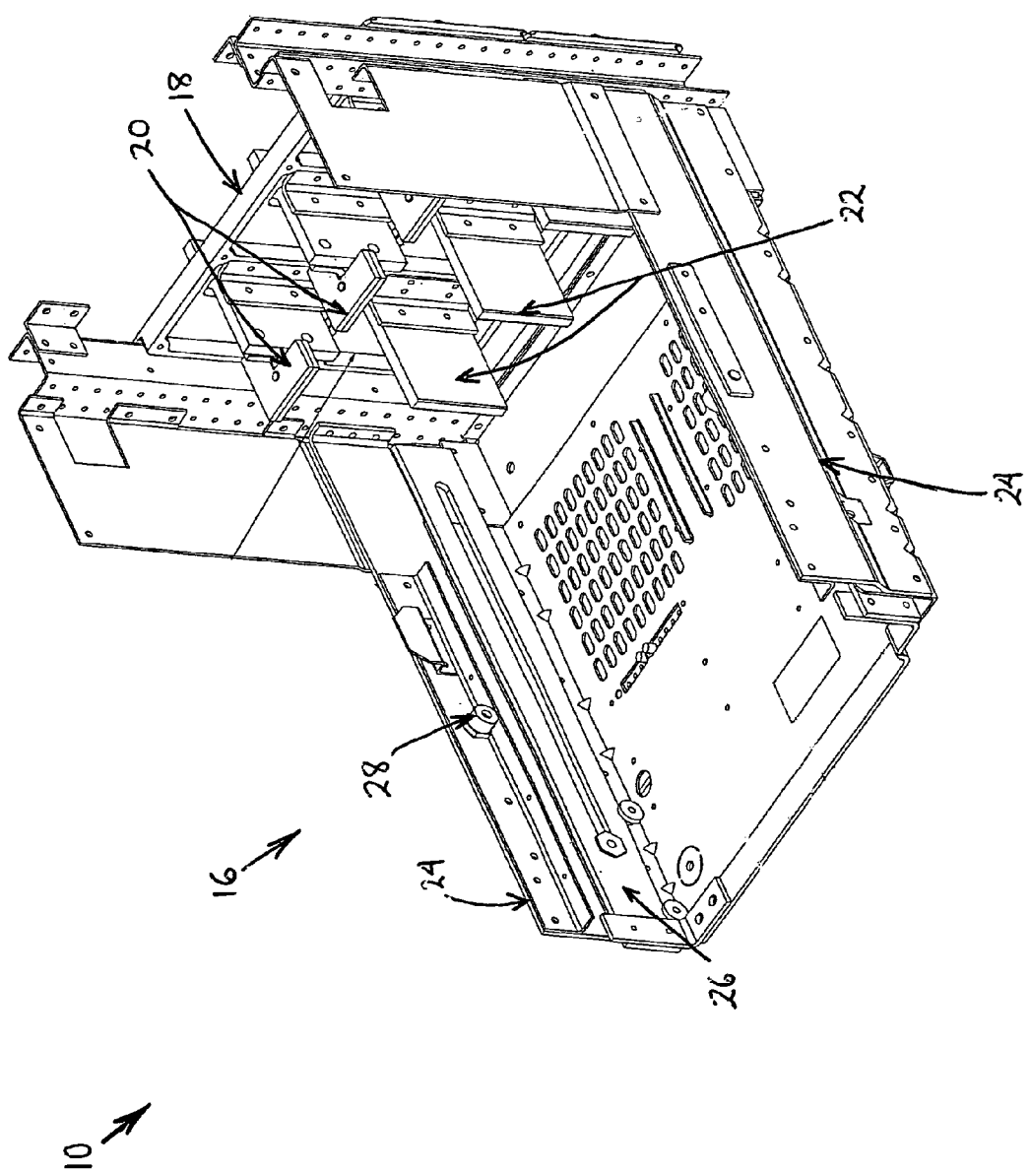
FIG. 1 is a top, front corner perspective view of a substructure of a prior art first switchgear system.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
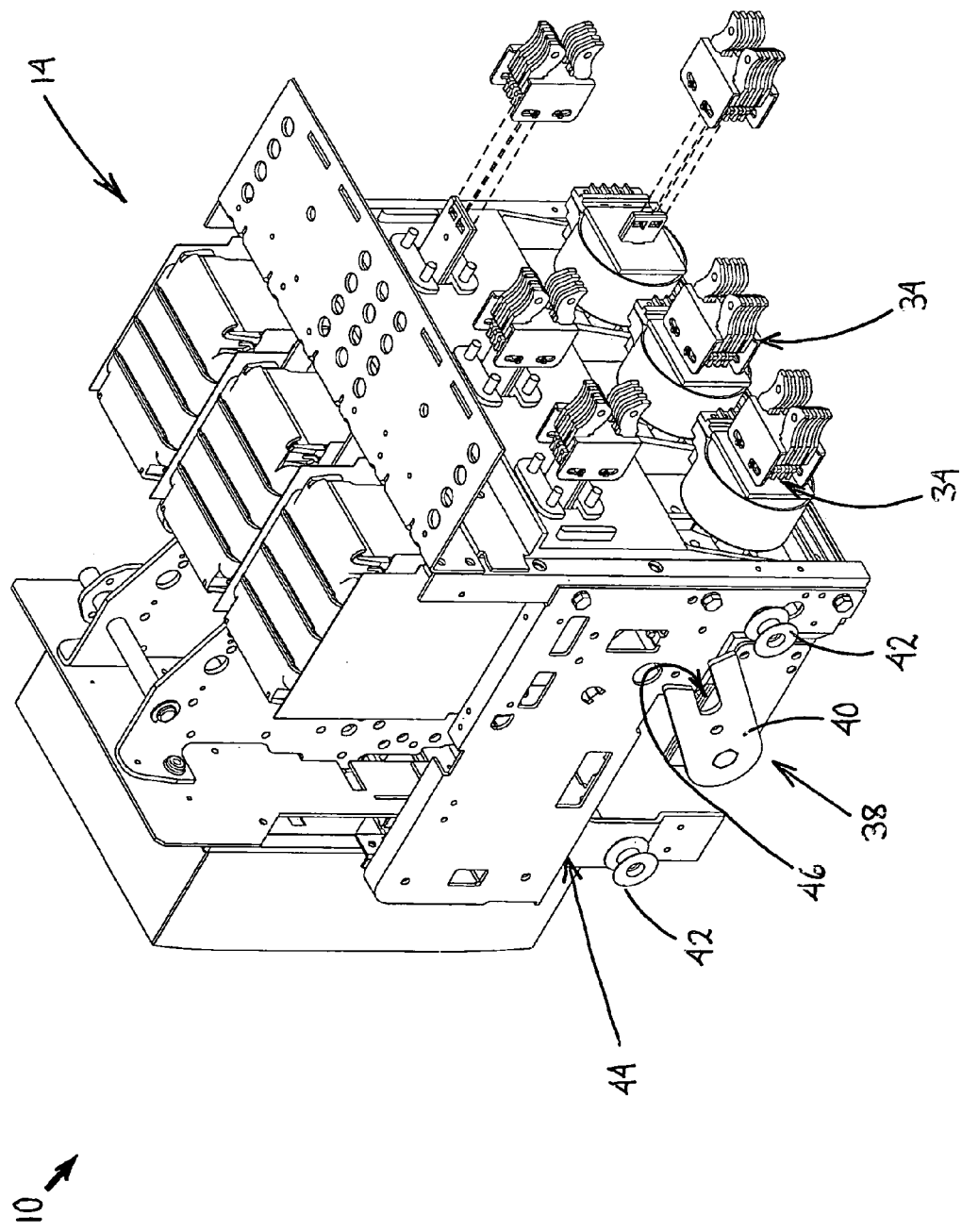
FIG. 2 is a top, rear corner perspective view of a first circuit breaker of the prior art first switchgear system.
Figure 3:
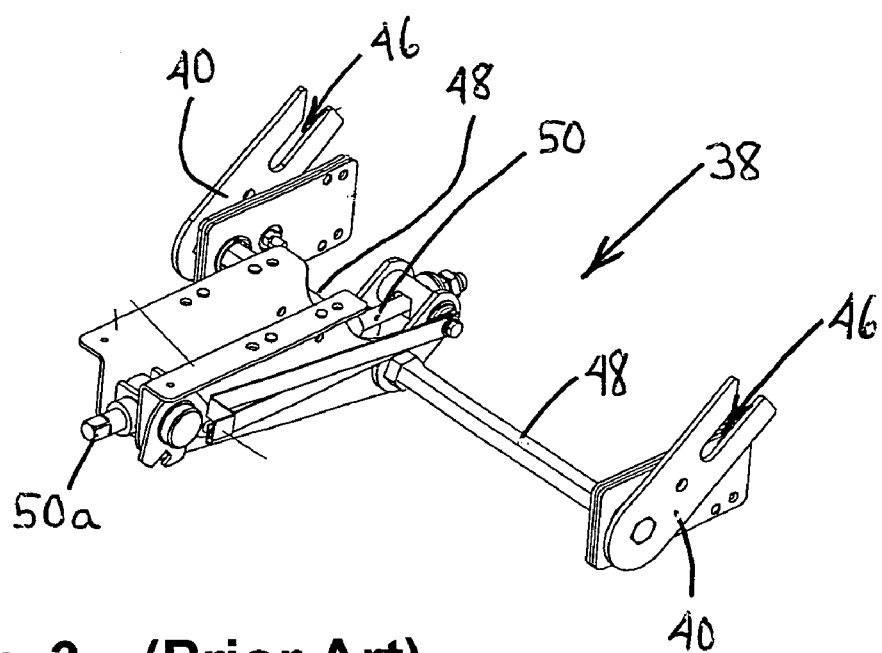
FIG. 3 is a top, front corner perspective view of a racking device of the first circuit breaker.
Figure 11:
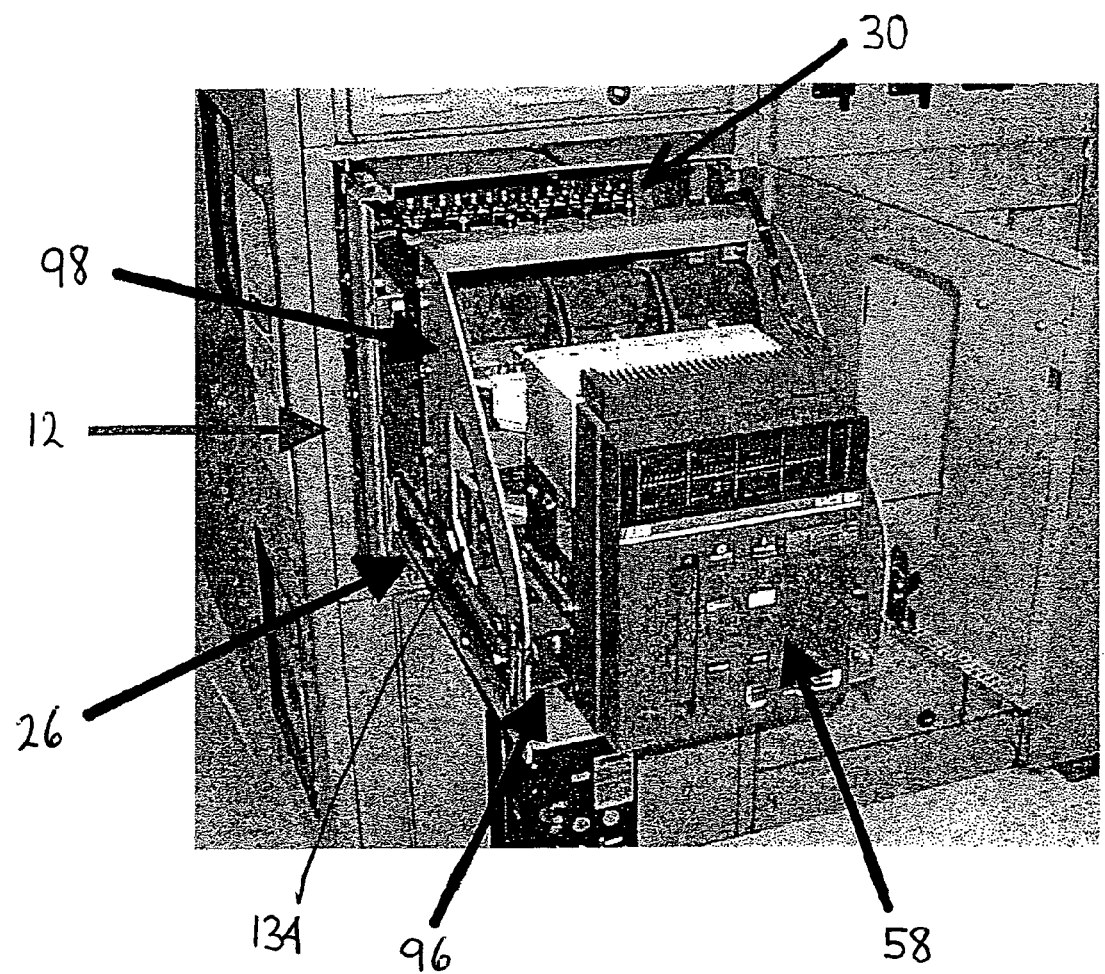
FIG. 11 is a front perspective view of the modified second circuit breaker being inserted into a cell of the first switchgear system, wherein the second circuit breaker is mounted to the adapter frame and has a pair of the gear assemblies mounted thereto.

A prior art first switchgear system 10 with removable breakers is partially shown in FIGS. 1–3. The first switchgear system 10 includes a first cabinet 12 (shown in FIG. 11), a first circuit breaker 14 (shown in FIG. 2) and a first substructure 16 (shown in FIG. 11) for mounting in the first cabinet 12.

With particular reference to FIG. 1, the first substructure 16 includes a rear end wall 18 with upper and lower stabs 20, 22 extending inwardly therefrom and opposing side walls 24 having rails 26 movably mounted thereto. A pair of racking pins 28 are secured to the side walls 24, respectively, and extend inwardly therefrom. The first substructure 16 is disposed in a cavity of the first cabinet 12 and cooperates with the cavity to define a cell 30 (shown in FIG. 11) for receiving the first circuit breaker 14.

With particular reference to FIG. 2, the first circuit breaker 14 includes connectors 34, manual interface devices (not shown) and a racking device 38. The racking device 38 includes a pair of draw-out or racking arms 40 disposed on opposing sides of the first circuit breaker 14. A pair of rollers 42 are mounted to side structures 44 of the first circuit breaker 14. Each of the racking arms 40 has a bifurcated end defining an open-ended slot 46. As shown in FIG. 3, the racking arms 40 are connected by shafts 48 to a main rod 50 with an end 50a adapted for engagement with a handle (not shown). When the main rod 50 is rotated by the handle, the shafts 48 rotate, thereby pivoting the racking arms 40.

The first circuit breaker 14 is mounted in the cell 30 of the first switchgear system 10 by placing the rollers 42 on the rails 26 of the first substructure 16 when the rails 26 are in extended positions. The rails 26 and the first circuit breaker 14 are then slid into the cell 30 such that the racking pins 28 enter the slots 46 of the racking arms 40. The handle is then engaged with the end 50a of the main rod 50 to rotate the main rod 50 such that the bifurcated ends of the racking arms 40 pivot toward the front of the first circuit breaker 14. This pivoting of the racking arms 40 moves the first circuit breaker 14 inwardly, toward the rear end wall 18, which causes the connectors 34 to engage the upper and lower stabs 20, 22, thereby establishing an electrical connection.

Figure 4:
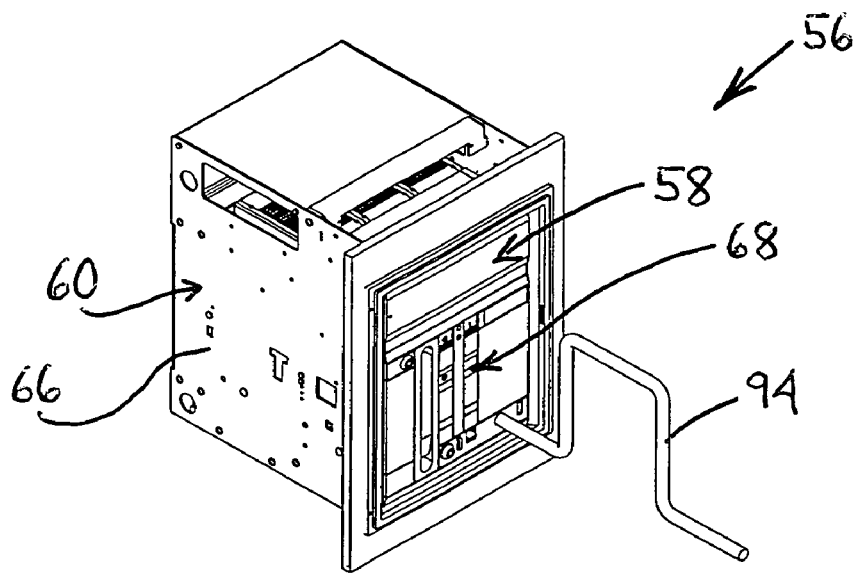
FIG. 4 is a top, front corner perspective view of a portion of a second prior art switchgear system.
Figure 5:
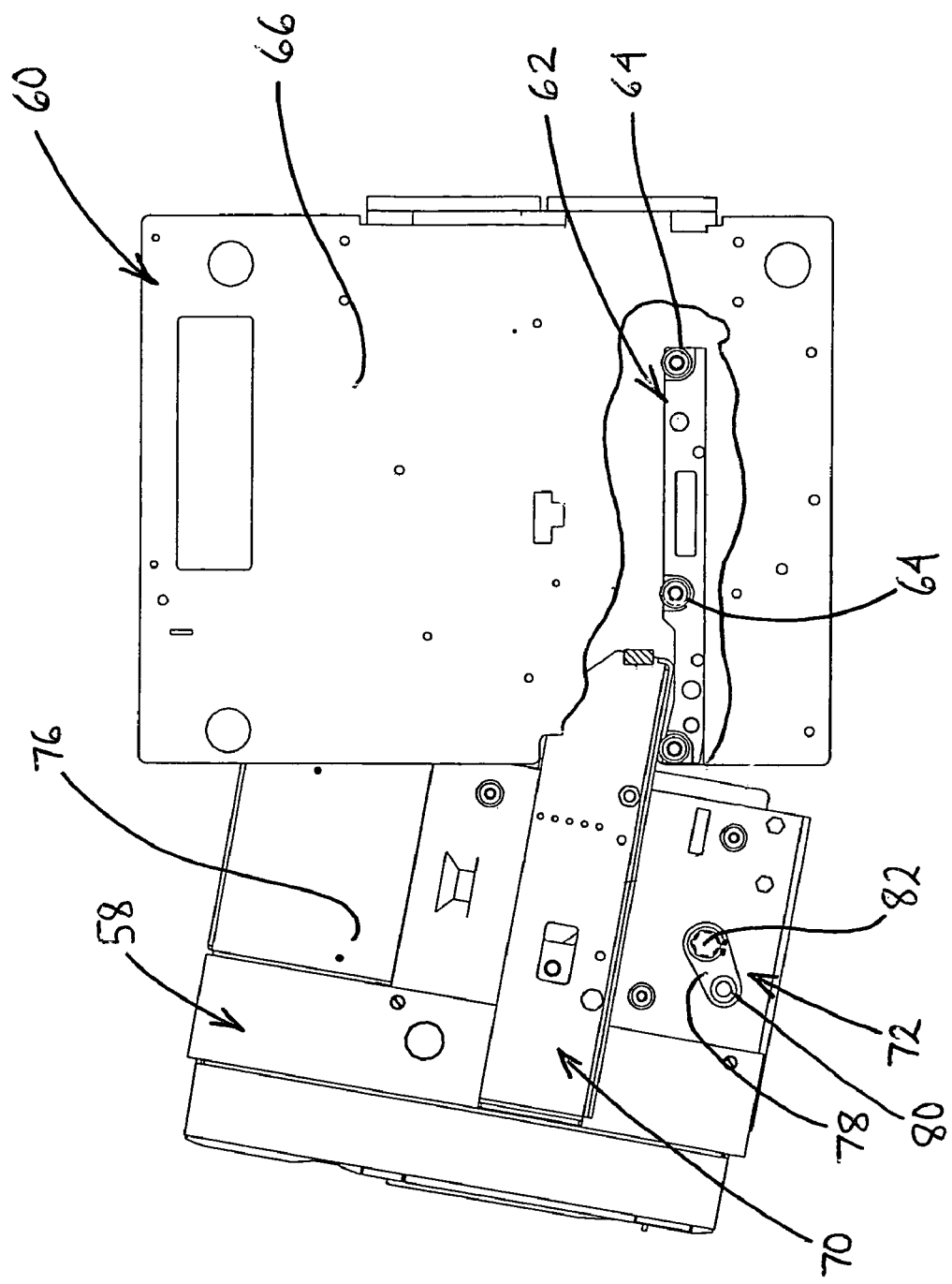
FIG. 5 is a side view of a portion of the second switchgear system showing a second circuit breaker being inserted into a second substructure, with a portion of a side wall of the second substructure broken away to show the operation of a racking device of the second circuit breaker.
Figure 6:
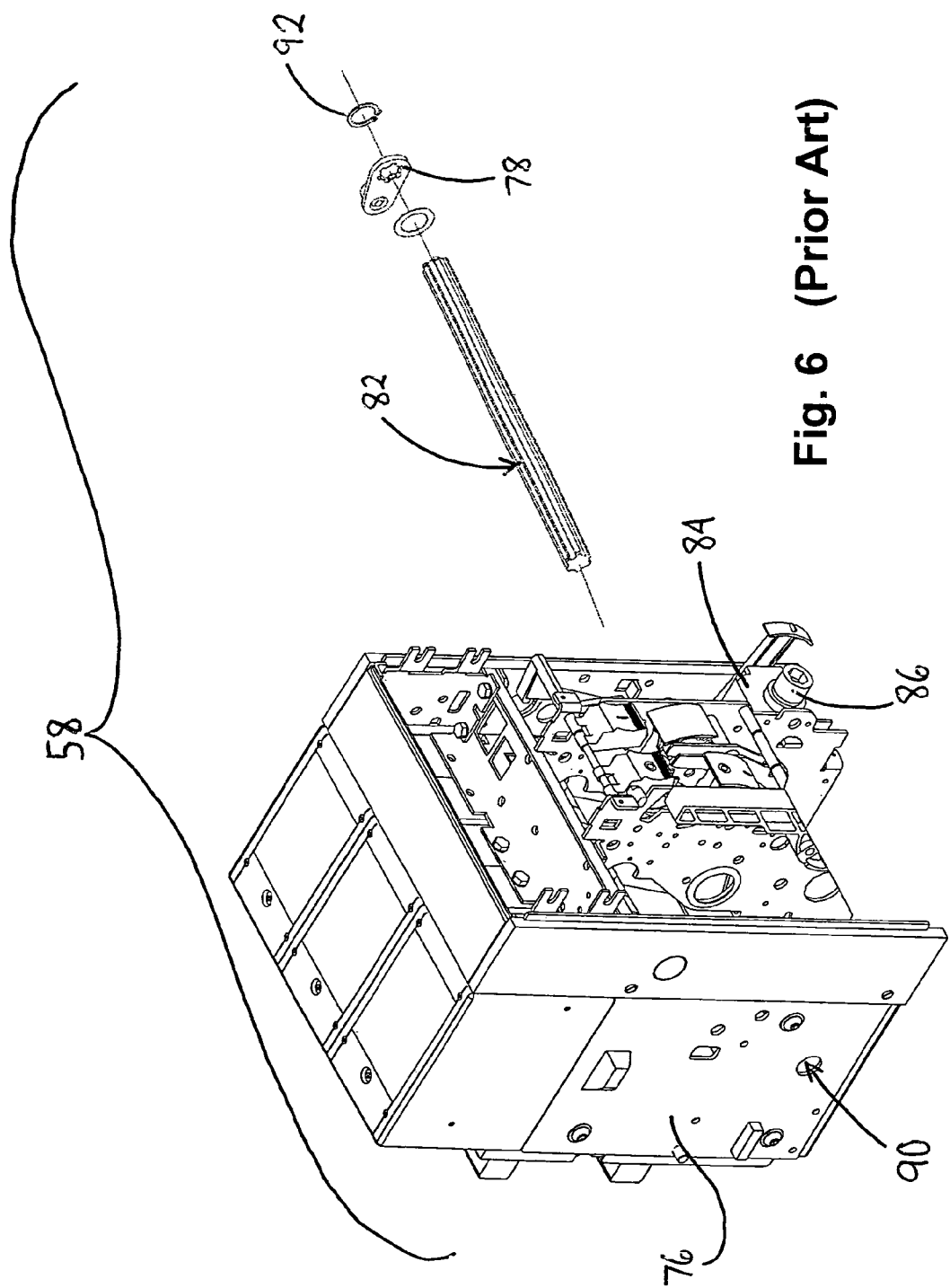
FIG. 6 is an exploded view of a portion of the second circuit breaker showing a ribbed shaft of the racking device, wherein a front panel and other components of the second circuit breaker have been removed for purposes of better showing the racking device.

Referring now to FIGS. 4–6 there is shown a portion of a prior art second switchgear system 56, which includes a second circuit breaker 58, a second substructure 60 and a second cabinet (not shown).

The second substructure 60 is generally cubicle in shape with an open front end. Rails 62 with rollers 64 are mounted to interior surfaces of opposing side walls 66. Connectors (not shown) are secured to a rear wall of the second substructure 60, over openings formed therein. The second substructure 60 is disposed in a cavity of the second housing and cooperates with the cavity to define a cell for receiving the second circuit breaker 58.

The second circuit breaker 58 has a different design and is of different make and model than the first circuit breaker 14. As a result, the second circuit breaker 58 is sized differently and operates differently than the first circuit breaker 14. For example, the second circuit breaker 58 is narrower than the first circuit breaker 14 and has a different racking mechanism than the first circuit breaker 14.

The second circuit breaker 58 includes terminal plates (not shown) for connection to the connectors on the rear wall of the second substructure 60. In addition, the second circuit breaker 58 includes manual interface devices 68, guides 70 and a racking device 72. The guides 70 are mounted to opposing side walls 76 of the second circuit breaker 58 and are adapted to engage the rails 62 of the second substructure 60, respectively. The racking device 72 includes a pair of draw-out or racking arms 78 disposed on opposing sides of the second circuit breaker 58. Each of the racking arms 78 has an asymmetrical elliptical shape with major and minor ends. Cylindrical contact members 80 are joined to, and extend laterally outward from the minor ends of the racking arms 78, respectively. The racking arms 78 are connected to a linking mechanism for rotating the racking arms 78. The linking mechanism includes a ribbed shaft 82 connected by a coupling 84 to a rotatable socket 86. Outer ends of the ribbed shaft 82 extend through openings 90 in the side walls 76 of the second circuit breaker 58, respectively. The outer ends are secured by retainers 92 to the racking arms 78, respectively. The socket 86 has an octagonal-shaped interior surface adapted to receive an end of a handle 94. When the socket 86 is rotated by the handle 94, the ribbed shaft 82 rotates, thereby rotating the racking arms 78.

In an embodiment of the present invention, the second circuit breaker 58 is designed to initially be manufactured without the racking device 72 and the guides 70 and to later be modified to have the racking device 72 and the guides 70. In this manner, a plurality of second circuit breakers 58 may be manufactured in a run, wherein a portion of the second circuit breakers 58 are for use in a removable application and a portion of the second circuit breakers 58 are for use in a fixed application. Those second circuit breakers 58 for use in the removable application are later modified to have the racking device 72 and the guides 70, while those second circuit breakers 58 for use in the fixed application are not modified.

In accordance with the present invention, the second circuit breaker 58 is modified to be used in the cell 30 of the first switchgear system 10 in lieu of the first circuit breaker 14. This modification may be performed before or after the racking device 72 and the guides 70 are mounted to the second circuit breaker 58. In the description below, the second circuit breaker 58 is modified after the racking device 72 and the guides 70 have been mounted to the second circuit breaker 58. The second circuit breaker 58 is modified by first securing a pair of gear assemblies 96 to the side walls 76 of the second circuit breaker 58, respectively, and then mounting the second circuit breaker 58 to an adapter frame 98.

Before the gear assemblies 96 are secured to the side walls 76, however, the guides 70 are removed from the side walls 76 and the racking arms 78 are removed from the ribbed shaft 82 by removing retainers 92. The ribbed shaft 82 is then removed from the second circuit breaker 58 by sliding the ribbed shaft 82 out through one of the openings 90 in the side walls 76. The ribbed shaft 82 is replaced by an extended ribbed shaft 100 (shown in FIG. 7) having substantially the same construction as the ribbed shaft 82, except for a pair of smooth outer extensions 102 located at opposing ends of the extended ribbed shaft 100. The outer extensions 102 provide the extended ribbed shaft 100 with a greater length than the ribbed shaft 82. The extended ribbed shaft 100 is slid into the second circuit breaker 58 through one of the openings 90 so as to extend through the coupling 84 and so as to have the outer extensions 102 disposed exterior to the side walls 76, respectively.

If the second breaker 58 is modified before the racking device 72 and the guides 70 have been mounted, the guides 70 and the racking arms 78, of course, do not have to be removed. In such a case, the extended ribbed shaft 100 is simply installed in the second circuit breaker 58.

Figure 7:
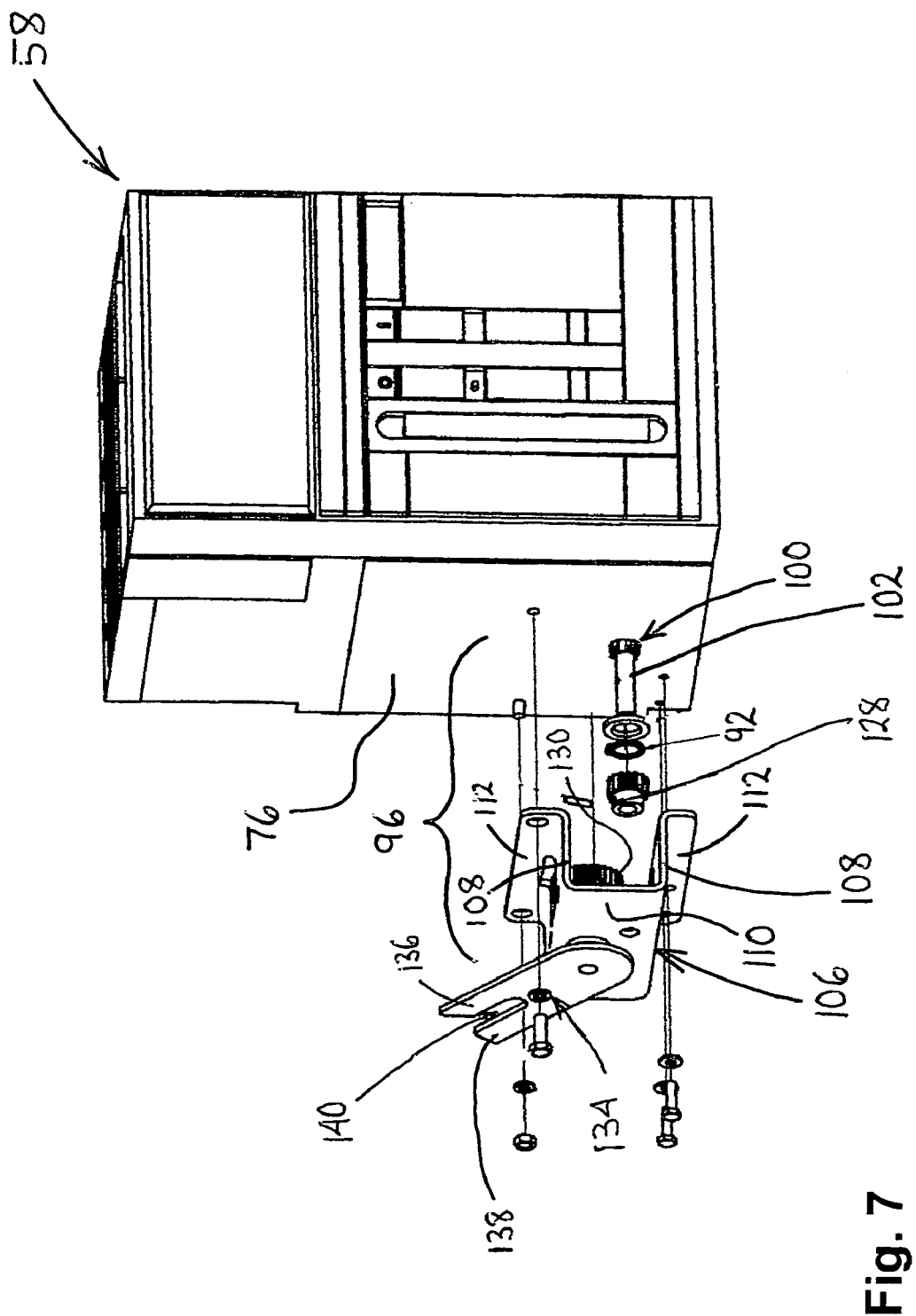
FIG. 7 is front corner perspective view of a modified version of the second circuit breaker with an exploded view of a gear assembly mounted to a side of the second circuit breaker.
Figure 8:
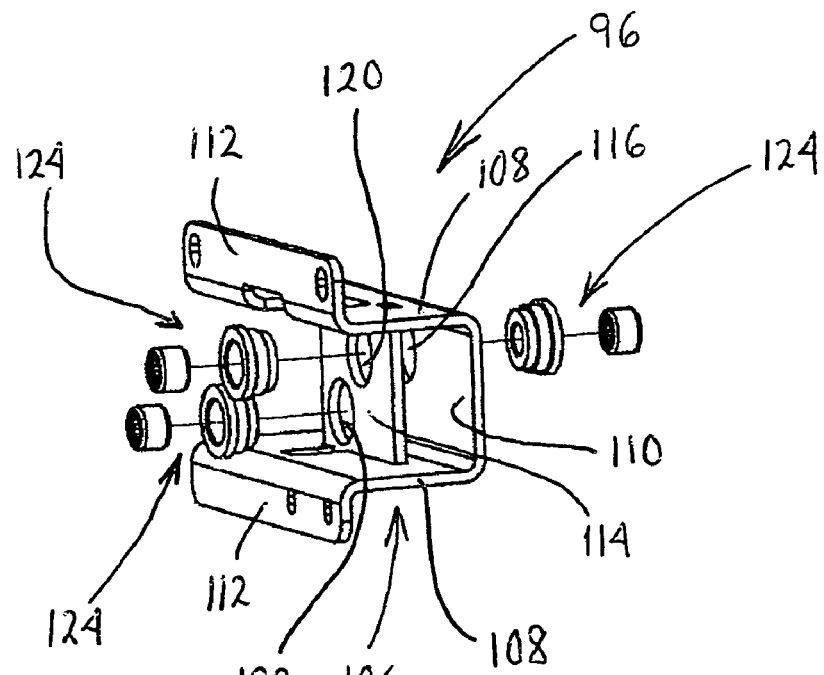
FIG. 8 is an inner exploded view of a portion of the gear assembly.
Figure 9:
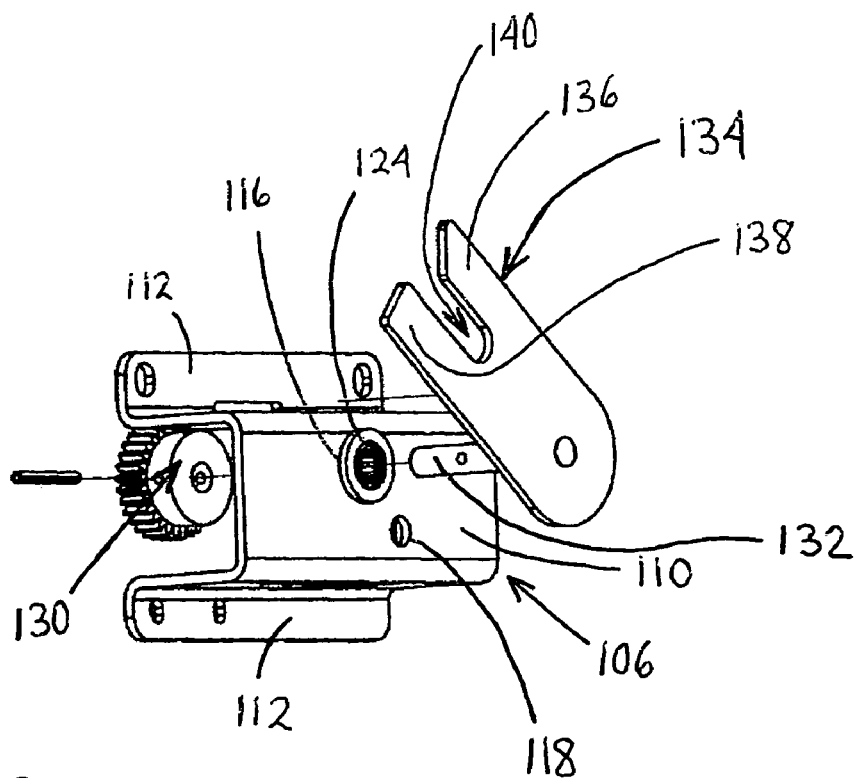
FIG. 9 is an outer exploded view of a portion of the gear assembly.

Referring now to FIGS. 7–9, one of the gear assemblies 96 will be described, it being understood that the other gear assembly 96 is a mirror image of the described gear assembly 96. The gear assembly 96 comprises a channel-shaped housing 106 having a pair of inwardly-extending arms 108 joined at substantially right angles to opposing edges of a center plate 110. Flanges 112 extend vertically in opposite directions from outer ends of the arms 108, respectively. An interior wall 114 extends between the arms 108 and is spaced from the center plate 110. A pair of openings 116, 118 are formed in the center plate 110 and are aligned with a pair of openings 120, 122 in the interior wall 114. The openings 120, 122 in the interior wall 114 are each fitted with a bearing assembly 124, while only the opening 116 in the center plate 110 is fitted with a bearing assembly 124. First and second gears 128, 130 are disposed inside the housing 106 in toothed engagement, whereby rotation of the first gear 128 in a first direction causes rotation of the second gear 130 in an opposite, second direction. The first gear 128 is substantially smaller than the second gear 130 and is secured to the outer extension 102 of the extended ribbed shaft 100 by the retainer 92. A smooth outer end of the first gear 128 extends into and is rotatably supported by the bearing assembly 124 in the opening 122 of the interior wall 114. The second gear 130 is secured to a mounting post 132 of a racking arm 134, which is disposed on an exterior side of the center plate 110. The mounting post 132 extends through and is rotatably supported by the bearing assemblies 124 in the openings 116, 120 and is secured to the second gear 130 inwardly of the interior wall 114. The racking arm 134 has substantially the same configuration as the racking arm 40 of the first circuit breaker 14 and includes a bifurcated end having first and second tines 136, 138 separated by a slot 140. The first tine 136 has a sloping outer edge for guiding the racking pin 28 into the slot 140, as will be described further below.

The housings 106 and, thus, the gear assemblies 96 are mounted to the side walls 76 of the second circuit breaker 58, respectively, by fasteners, such as screws, that extend through openings in the flanges 112 and are received in corresponding openings in the side walls 76.

Figure 10:
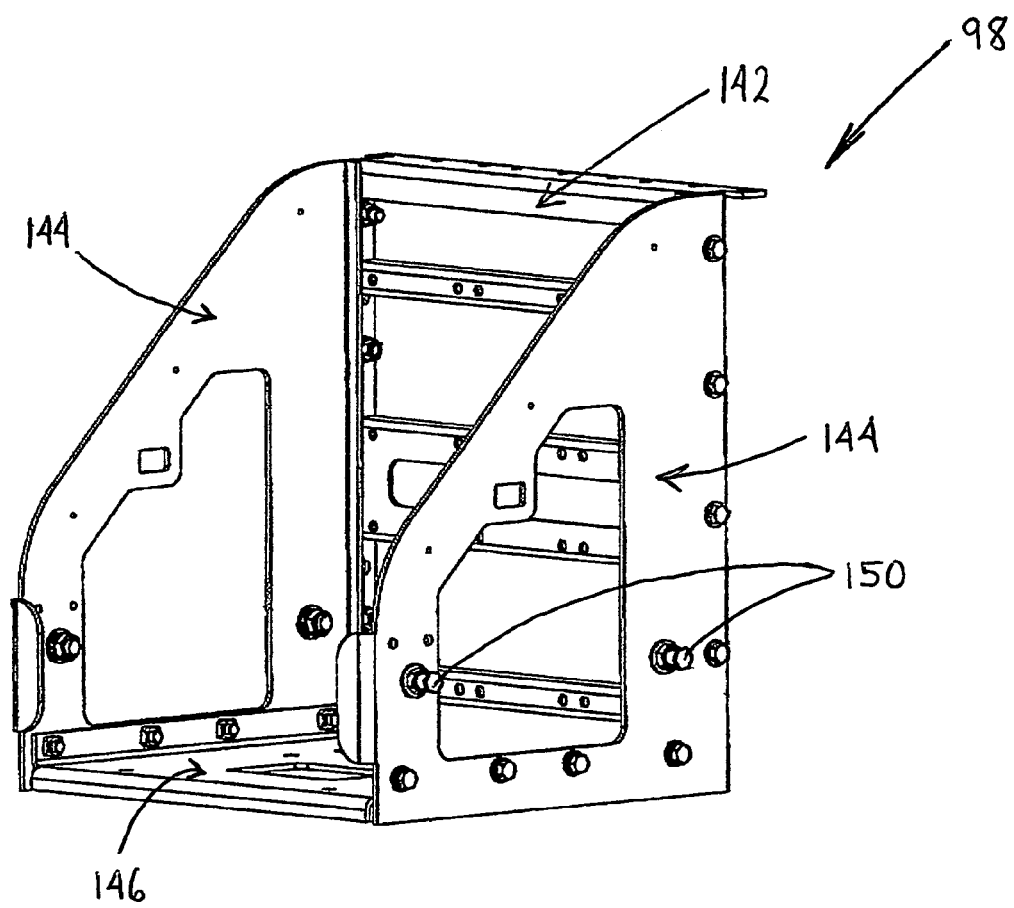
FIG. 10 is a front corner perspective view of an adapter frame for modifying the second circuit breaker.

Referring now to FIG. 10, the adapter frame 98 generally includes a rear end wall 142 and a pair of side walls 144 joined to and extending upwardly from a bottom wall 146. A front end of the adapter frame 98 is open to permit insertion of the second circuit breaker 58. Each of the side walls 144 has a pair of support pins 150 extending outwardly therefrom. The adapter frame 98 is provided to support the second circuit breaker 58 on the rails 26 of the substructure 16 in the cell 30. In essence, the adapter frame 98 increases the footprint of the second circuit breaker 58 so as to be similar to the footprint of the first circuit breaker 14. The adapter frame 98 may include connectors adapted for connecting the terminal plates of the second circuit breaker 58 to the upper and lower stabs 20, 22 of the substructure 16 when the second circuit breaker 58 with the adapter frame 98 is disposed in a connected position in the cell 30. Alternately, connectors may be directly connected to the terminal plates of the second circuit breaker 58 and may extend through openings in the rear end wall 142 to engage the upper and lower stabs 20, 22 of the substructure 16.

The second circuit breaker 58 is mounted to the adapter frame 98 such that the racking arms 134 are disposed exterior to the side walls 144. The second circuit breaker 58 may be secured to the adapter frame 98 by fasteners such as screws or bolts extending through openings in the rear wall and/or the bottom wall of the adapter frame 98 and into corresponding threaded openings in a bottom wall and/or rear wall of the second circuit breaker 58.

With the second circuit breaker 58 mounted to the adapter frame 98 in the manner described above, the adapter frame 98 is placed on the rails 26 of the first substructure 16. More specifically, the rails 26 are pulled out to extended positions and the adapter frame 98 is placed on the rails 26 such that the support pins 150 of the adapter frame 98 are supported on the rails 26 of the first substructure 16. The rails 26 are then slid into the cell 30 to retracted positions. As the rails 26 are slid inwardly, the racking pins 28 are guided into the slots 140 of the racking arms 134 by the sloping outer edges of the first tines 136. When the rails 26 are in the retracted positions, the racking pins 28 are fully disposed in the slots 140. At this point, the second circuit breaker 58 is ready to be racked to a connected position. In order to rack the second circuit breaker 58, the end of the handle 94 is inserted into the socket 86 through an opening in a front panel 152 of the second circuit breaker 58. The handle 94 is then rotated in a clockwise direction (as viewed from the front of the second circuit breaker 58), which causes the extended ribbed shaft 100 to rotate in a counter-clockwise direction (as viewed from the left side of the second circuit breaker 58 shown in FIG. 7). The counter-clockwise rotation of the extended ribbed shaft 100 is conveyed to the first gears 128, which translate the counter-clockwise rotation to clockwise rotation of the second gears 130 (as viewed from the left side of the second circuit breaker 58 shown in FIG. 7). The clockwise rotation of the second gears 130 is conveyed to the racking arms 134, which causes the bifurcated ends of the racking arms 134 to pivot toward the front of the second circuit breaker 58. The pivoting of the racking arms 134, in turn, moves the second circuit breaker 58 inwardly, toward the rear end wall 18, which causes the connectors to engage the upper and lower stabs 20, 22, thereby establishing an electrical connection.

It should be appreciated that the racking arms 134 are configured to match the racking arms 40 of the first circuit breaker 14 and that the adapter frame 98 and the gear assemblies 96 are constructed to position and operate the racking arms 134 in substantially the same manner as the racking arms 40 of the first circuit breaker 14 so as to move the second circuit breaker 58 between connected and disconnected positions in substantially the same manner as the first circuit breaker 14. For example, as a result of the particular construction of the second circuit breaker 58, the rotation of the extended ribbed shaft 102 (as applied to the racking arms 134) has to be changed to match the rotation of the shafts 48 (as applied to the racking arms 40 of the first circuit breaker 14). More specifically, as applied to the racking arms 134, the axis of rotation of the extended ribbed shaft 102 has to be moved rearwardly and upwardly, the direction of rotation has to be reversed, and the speed of rotation has to be slowed. These changes are accomplished by providing and properly sizing and locating, the first and second gears 128, 130. In other embodiments of the present invention, the changes required for the rotation of the extended ribbed shaft 102 (as applied to the racking arms 134) may be different, which would require a different gearing for the gear assemblies 96. For example, in another embodiment, the direction of rotation of the extended ribbed shaft 102 may not need to be reversed. In such a case, three gears may be provided instead of two. In another embodiment, the speed of rotation of the extended ribbed shaft may need to be increased, instead of decreased. In such a case, the first gear 128 may be made larger than the second gear 130.

Although two gear assemblies 96 are disclosed as being provided, it should be appreciated that in other embodiments of the present invention, only one gear assembly 96 may be required or desired, or more than two gear assemblies 96 may be required or desired.

The present invention provides numerous benefits. The present invention provides better reliability because it produces a mechanical interface between the circuit breaker and the cell that is simple and direct, and it avoids the use of older, refurbished parts common to many retrofits. In addition, with the present invention, it is easier to maintain mechanical and electrical integrity and performance during racking, short circuit, impulse and heat run (continuous current) testing. With the present invention, the switchgear upgrade can be accomplished using standard, new production breakers and their racking systems at a low cost, faster, and with less down time than conventional means.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of producing a retrofitted circuit breaker for use in a switchgear assembly having a cell with a racking structure disposed therein, said method comprising the steps of:
   (a.) providing a circuit breaker that is not adapted for mounting in the cell, said circuit breaker comprising a mechanical linkage connected to a shaft, said mechanical linkage being actuatable to rotate the shaft;
   (b.) providing an adapter frame for supporting the circuit breaker in the cell;
   (c.) providing a gear assembly comprising first and second gears;
   (d.) providing a racking arm;
   (e.) mounting the gear assembly to the circuit breaker so as to be operatively engaged by the shaft such that the rotation of the shaft causes rotation of the second gear, wherein the axis of rotation of the second gear is not coaxial with the axis of rotation of the shaft;
   (f.) connecting the racking arm to the second gear of the gear assembly such that rotation of the second gear causes the racking arm to rotate; and
   (g.) mounting the circuit breaker to the adapter frame; and
   (h.) wherein after steps (a) through (g), the circuit breaker with the adapter frame and the gear assembly is adapted for mounting within the cell such that when the circuit breaker is in a first, disconnected position in the cell and the mechanical linkage is actuated, the racking arm engages the racking structure of the cell and pivots, thereby moving the circuit breaker farther into the cell to a second, connected position.

2. The method of claim 1, wherein the rotation of the second gear is in a direction opposite to the direction of rotation of the shaft.

3. The method of claim 1, wherein the racking arm has a bifurcated end defining a slot.

4. The method of claim 3, wherein the slot is adapted to receive the racking structure.

5. The method of claim 1, wherein the gear assembly is a first gear assembly, and wherein the method further comprises:
   providing a second gear assembly having first and second gears;
   providing a second racking arm;
   mounting the second gear assembly to the circuit breaker so as to be operatively engaged by the shaft such that the rotation of the shaft causes rotation of the second gear of the second gear assembly, wherein the axis of rotation of the second gear of the second gear assembly is not coaxial with the axis of rotation of the shaft; and
   connecting the second racking arm to the second gear of the second gear assembly such that rotation of the second gear causes the second racking arm to rotate.

6. The method of claim 5, wherein the first and second gear assemblies are mirror images of each other and are mounted to opposing sides of the circuit breaker.

7. The method of claim 1, further comprising the step of removing a previous racking arm from the circuit breaker before performing step (f.).

8. The method of claim 7, further comprising the steps of:
   removing a previous shaft from the circuit breaker after the previous racking arm has been removed; and
   installing the shaft in the circuit breaker.

* * * * *